Patented July 13, 1948

2,445,195

UNITED STATES PATENT OFFICE 2,445,195

PURIFICATION OF HALOGENATED AROMATIC HYDROCARBONS

Robert R. Umhoefer, Pittsfield, Mass., assignor to General Electric Company, a corporation of New York No Drawing. Application June 24, 1944, Serial No. 542,017

3 Claims. (Cl. 260—649)

The present invention comprises a process for purifying aryl hydrocarbons which are contaminated with aliphatic compounds.

In the industrial use of aryl hydrocarbons, such, for example, as halogenated compounds of benzene, diphenyl, naphthalene, or the like, some unavoidable contamination of halogenated hydrocarbons with mineral oil, aliphatic solvents, varnish ingredients, or other undesired aliphatic compounds is apt to occur. Heretofore such contaminated material has constituted an economic waste of considerable magnitude as no methods of purification of sufficient economy were known.

I have discovered that contaminated halogenated aromatic hydrocarbons may be purified and reclaimed for further use by a procedure involving the decomposition or cracking of the undesired aliphatic components to yield gaseous or solid components which are removable by simple steps, for example, volatilization or filtration.

Aromatic hydrocarbons are more resistant to decomposition by a catalyst at elevated temperatures than are aliphatic hydrocarbons. Substituted aliphatic hydrocarbons such as the chlorinated aliphatic compounds, alcohols, esters, etc. which also may be present as contaminants in halogenated aromatic hydrocarbons are readily decomposed in the presence of a catalyst at temperatures at which halogenated aromatic hydrocarbons are relatively stable.

In carrying out my invention the contaminated halogenated aromatic hydrocarbon material is heated in the presence of a catalyst to a moderately elevated temperature. Catalysts are preferred which are effective at temperatures normally not exceeding 250° C. to break down "or crack" the molecular structure of the undesired compounds. The chloride of aluminum or iron are examples of suitable catalysts. The amount and nature of catalyst required in any particular case depends on the relative amount and nature of the contaminants and other conditions. For example, it may be desirable to employ a relatively low temperature for the cracking reaction, because of the volatility of the product to be purified or other reason. In such event, a greater amount of catalyst may be required than needed if higher temperatures are available.

Compositions comprising halogenated aromatic compounds are employed for dielectric and insulating purposes as described, for example, in U. S. Patent 1,931,373, patented October 17, 1933, a common example being compositions consisting of chlorinated diphenyl either alone or associated with trichlorbenzene. In the course of manufacturing electrical apparatus and charging it with such hydrocarbons, mineral oil contaminant may be introduced in amounts up to 5 to 10 per cent or more. Aliphatic solvents may be introduced by washing operations. Contaminants of this sort may be removed by heating the contaminated halogenated aryl material to about 200° C. in the presence of a suitable catalyst such, for example, as aluminum chloride, $AlCl_3$. The catalyst may be present in an amount by weight equal to about one half the weight of the mineral oil. Decomposition of the oil begins to be appreciable at about 150° C., but a higher temperature speeds the reaction.

In some cases the desired decomposition of the aliphatic compound may be promoted by hydrogen halide. In some cases, particularly when a relatively low reaction temperature is desirable, hydrogen chloride, or other suitable hydrogen halide may be introduced into the reaction zone, or set free by the decomposition of a halide in the reaction zone.

The time needed to completely decompose the aliphatic compounds is dependent on the type of compounds present and also the proportion of catalyst and the temperature at which the reaction is carried out. Using an $AlCl_3$ to oil ratio of 1:2 the reaction is substantially complete after heating for 6 hours at 200° C. Volatile decomposition products may be removed in vapor form.

A number of methods may be used to refine or further purify the resulting product which may contain carbon and other non-volatilizable impurities. A colorless material suitable for dielectric purposes is obtained by filtration through fuller's earth, alumina, silica gel, decolorizing carbon or other suitable filtering medium. The ease of filtration may frequently be improved by first coagulating the suspended carbon particles with an alkaline copper sulfate solution, as described in Clark U. S. Patent 2,205,187, patented June 18, 1940. The amount of filtering medium and time needed to refine the product can be reduced by using agents like concentrated sulfuric acid to remove the color.

Another method of reducing the color, which avoids to a large extent the corrosive effect of sulfuric acid on equipment, consists in heating the product at 100 to 150° C. in contact with ferric chloride and subsequently passing the material through absorbents.

What I claim as new and desire to secure by Letters Patent of the United States, is:

1. The method of purifying a halogenated aromatic composition containing aliphatic impurities which consists in heating said composition for several hours to about 150 to 250° C. in the presence of a catalyst chosen from the group consisting of chlorides of aluminum and iron and until said impurities are decomposed, removing the gaseous decomposition products from said composition by volatilization of the gaseous products and removing the solid decomposition products by filtration.

2. The method of removing aliphatic compounds from a composition comprising halogenated aromatic compounds which consists in decomposing the aliphatic compounds by heating said composition to a temperature of about 200° C. for about six hours in the presence of a catalyzer chosen from the group consisting of the chlorides of aluminum and iron, volatilizing vaporizable decomposition products and removing solid decomposition products from the residue by filtration.

3. The method of removing aliphatic impurities including mineral oil from a composition composed mainly of chlorinated diphenyl which consists in heating said composition for about six hours to an elevated temperature of about 150 to 250° C. with a chloride of a metal chosen from the group consisting of aluminum and iron, removing gaseous decomposition products from said composition by volatilization of the gaseous products, and removing solid decomposition products by filtration.

ROBERT R. UMHOEFER.

REFERENCES CITED

The following references are of record in the file of this patent:

UNITED STATES PATENTS

| Number | Name | Date |
|---|---|---|
| 1,741,305 | Jaeger | Dec. 31, 1929 |
| 2,005,840 | Engelhardt | June 25, 1935 |
| 2,311,189 | Peterson | Feb. 16, 1943 |

FOREIGN PATENTS

| Number | Country | Date |
|---|---|---|
| 150,310 | Austria | Aug. 10, 1937 |
| 226,188 | Great Britain | Mar. 29, 1926 |